July 28, 1964     D. PETERSON     3,142,101

PIN FASTENING DEVICE

Filed Sept. 26, 1962

INVENTOR.
Dana Peterson
BY

United States Patent Office 3,142,101
Patented July 28, 1964

3,142,101
PIN FASTENING DEVICE
Dana Peterson, P.O. Box 2141, San Diego, Calif.
Filed Sept. 26, 1962, Ser. No. 226,255
2 Claims. (Cl. 24—158)

This invention is, in combination, a manipulating pin fastening device comprising operatively engageable portions in association with a plurality of work engageable members. It is a cloth material or the like piercing spring action pin fastening device adapted to be readily attached to a coat lapel, blouse, or the like. The use of the word "pin" in this application is intended as a synonym of the common insignia "button" with fastening means in the back of said button. My pin fastening device provides non-tearing, operative, engageable and locking slender wire pointed leg members with a protective leg members cover.

Many pin fastening devices used to fasten organization pins or buttons to clothing are of the screw fastening type or employ pointed fastening members of large diameters. Said threaded or blunt members sever threads in cloth material or the like when those types of pins are used. It is believed that my new pin fastening device with its needlelike, sharp pointed, smooth wire leg members will pass through closely woven cloth material or the like without tearing or damage to same. It is further believed that the use of my new pin fastening device is justified by its low cost, ease of attachment and detachment, and protective cover of its leg members, without losing sight of customer appeal in addition to its objective value.

This invention together with its objects and advantages will be best understood from a study of the following description taken in connection with the accompanying drawings wherein.

In the drawings, like characters of reference indicate corresponding parts in the different views.

My novel combination of pin fastening means consists essentially of three elements, i.e., a pin or ornamental member, a wire fastening member having diverging securing legs and a cover member for the points of the legs.

Figure 8:
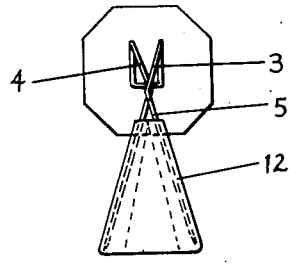
FIGURE 8 is a rear view of locked relation between leg members of the pin fastening device and the leg members cover.
Figure 9:
FIGURE 9 is a side view of locked relation between leg members of the pin fastening device and the leg members cover.
Figure 10:
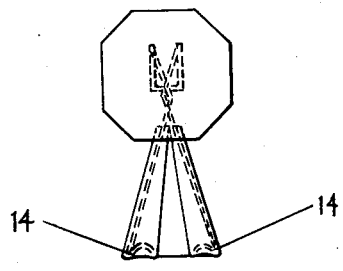
FIGURE 10 is a front view of locked relation between leg members of my pin fastening device and the leg members cover.
Figure 11:
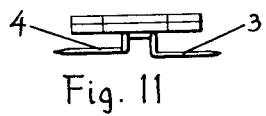
FIGURE 11 is a top view of the pin fastening device without the leg members cover.
Figure 12:
FIGURE 12 is a bottom view of the leg members cover.

The pin member may be of any desired shape and is provided on the front face thereof with suitable ornamental design which forms no part of the present invention. The rear surface 1 of the pin member is substantially planar and forms the supporting surface to which is attached the wire fastening member. The fastening member is formed of relatively small diameter resilient wire and is of generally U-shaped form. The intermediate of bent middle section 2 of the U-shaped member is secured as by any suitable cementing means to the rear surface 1 of the ornamental pin member. Portions 3 and 4 of the leg member which are adjacent intermediate portion 2 are generally parallel and slightly offset from rear surface 1. Extending downwardly from parallel portions 3 and 4 are diverging leg portions 5 having pointed extremities 6. One of the leg members is offset, transversely of its length, from the other leg member as clearly shown in FIGURES 8 and 11. This will prevent interference between the leg member and permit the portion 3 to cross over the portion 4 in spaced relation as the extremities 6 of the leg members are moved towards each other as will be more clearly set forth hereinafter.

Reference numeral 9 indicates the cover for the leg member. This is preferably formed of any suitable sheet material and has sloping side portions and general parallel top and bottom portions. Inturned flanges 12 are provided on the sides of member 9. These flanges are spaced from and generally parallel to the inside surface of member 9 to provide a lower aperture 10 and an upper aperture 11. The lower edge 13 of each flange 12 is bent or crimped in to form pockets 14 for the reception of the pointed ends 6 of legs 5.

Operation

Figure 1:
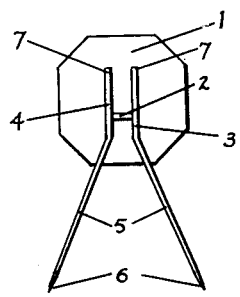
FIGURE 1 is a rear view of my pin fastening device without its leg members cover.
Figure 2:
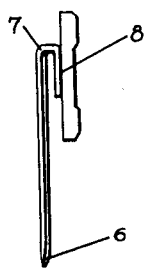
FIGURE 2 is a side view of the pin fastening device without its leg members cover.
Figure 3:
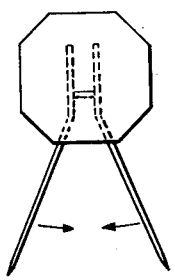
FIGURE 3 is a front view of the pin fastening device without its leg members cover.
Figure 4:
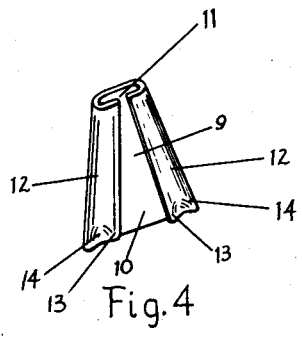
FIGURE 4 is a front perspective view of the leg members cover of my pin fastening device.
Figure 5:
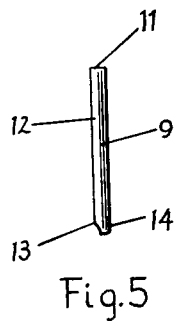
FIGURE 5 is a side view of said cover.
Figure 6:
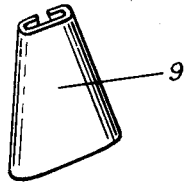
FIGURE 6 is a rear perspective view of the leg members cover.
Figure 7:
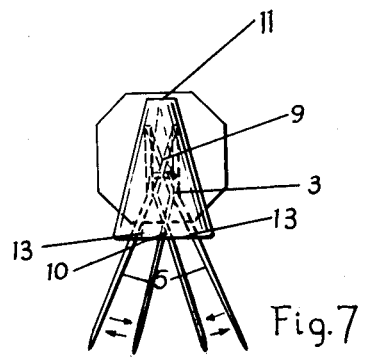
FIGURE 7 is a rear view of guided and unlocked relation between leg members of the pin and its leg members cover.

To fasten my ornamental pin to cloth material or the like the leg members 3 and 4 are grasped between the fingers and pressed together as shown by the arrows in FIGURE 3 until the extremities 6 are relatively close together as shown by the inside position of the legs in FIGURE 7. This position of the leg members is effected by reason of the fact that the legs are offset from one another so that they may slide one on top of the other. When the points 6 of leg members 5 are spaced apart a distance approximately equal to the distance between the points 7—7 of the leg members, as seen in FIGURE 1, they are forced through the cloth or like material. Finger pressure is now released on the leg members and the pin is pushed down as far as it will go. The pin will now be on the front of the cloth or like material and the leg portions exposed on the rear side thereof expanded to the position shown in FIGURE 1. Cover member 9 is now placed over the leg members in the position shown in FIGURE 7 and moved downwardly drawing the leg members 5 slightly together until the extremities 6 snap past the crimped portion 13 and drop into pockets 14 in which position the cover member will be securely held on the leg members.

To remove the pin the cover member 9 is grasped by the fingers and moved downwardly further compressing the leg members 5 until it is withdrawn completely therefrom. The pin may now be easily withdrawn by pulling it upwardly. The leg members will easily compress without tearing the material as they are drawn therethrough.

It is understood that minor variation from the form of the invention disclosed herein may be made without departure from the spirit and scope of the invention, and that the specification and drawings are to be considered as merely illustrative rather than limiting.

I claim:
1. In combination:
   a decorative pin member having a front surface and a rear surface spaced therefrom;
   a fastening means including a pair of resilient leg members diverging outwardly to pointed extremities and joined at a center section, said center section being secured to said rear surface, said legs being spaced from said rear surface and one leg being offset from the other whereby said legs may overlap when the pointed extremities are moved towards each other; and a cover member for said leg members including a sheet material body member having inturned side flanges extending parallel to the body member and enclosing said leg members, the end of each flange adjacent said pointed extremities having a pocket for the reception of said pointed extremities whereby said cover is removably secured to said leg members.

2. In combination:

a decorative pin member;

fastening means comprising a pair of elongated leg members joined to said pin member;

said leg members having portions spaced apart a short distance and said legs extending divergently outwardly from said spaced portions and terminating in free, pointed extremities;

said leg members being resilient whereby said extremities may be pressed toward each other till said extremities are said short distance apart so that the extremities can be first inserted through a section of cloth and thereafter expand apart;

said leg members being relatively offset transversely of the length thereof so that intermediate portions of the leg members can cross each other in spaced relation when the said extremities are pressed together;

and a cover member discrete from said pin member, said cover member being removably slidable over said leg members and having confronting pockets receiving said pointed extremities in the position thereof assumed when the legs are expanded apart.

References Cited in the file of this patent

UNITED STATES PATENTS

| | | |
|---|---|---|
| 504,634 | Stevens | Sept. 5, 1893 |
| 662,539 | Loving | Nov. 27, 1900 |
| 999,845 | Nooven | Aug. 8, 1911 |
| 1,336,692 | Forman | Apr. 13, 1920 |
| 1,647,589 | Sweet | Nov. 1, 1927 |
| 1,703,151 | King | Feb. 26, 1929 |
| 1,783,470 | Hembold et al. | Dec. 2, 1930 |
| 2,147,291 | Gawiler | Feb. 14, 1938 |
| 2,292,429 | Buick | Aug. 11, 1942 |
| 3,049,770 | Moghadam | Aug. 21, 1962 |